United States Patent
Ma et al.

(10) Patent No.: US 7,243,100 B2
(45) Date of Patent: Jul. 10, 2007

(54) METHODS AND APPARATUS FOR MINING ATTRIBUTE ASSOCIATIONS

(75) Inventors: Sheng Ma, Ossining, NY (US); Chang-shing Perng, Bedford Hills, NY (US); Haixun Wang, Tarrytown, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 10/630,992

(22) Filed: Jul. 30, 2003

(65) Prior Publication Data

US 2005/0027710 A1    Feb. 3, 2005

(51) Int. Cl.
G06F 17/30 (2006.01)
G06F 17/00 (2006.01)

(52) U.S. Cl. .............................. 707/6; 707/7; 707/102; 706/46

(58) Field of Classification Search ............. 707/1–7, 707/100–103 R, 104.1, 200; 706/45–50, 706/52; 709/218–220; 700/30–31, 44
See application file for complete search history.

(56) References Cited

U.S. PATENT DOCUMENTS

| | | | |
|---|---|---|---|
| 5,692,107 A * | 11/1997 | Simoudis et al. ............ 706/12 |
| 5,933,821 A * | 8/1999 | Matsumoto et al. ........... 707/1 |
| 6,006,029 A * | 12/1999 | Bianchi et al. .............. 703/24 |
| 6,108,004 A * | 8/2000 | Medl ......................... 715/804 |
| 6,272,478 B1 * | 8/2001 | Obata et al. ................. 706/12 |
| 6,292,797 B1 * | 9/2001 | Tuzhilin et al. ............... 707/6 |
| 6,311,173 B1 * | 10/2001 | Levin et al. .................. 706/21 |
| 6,324,533 B1 * | 11/2001 | Agrawal et al. ............... 707/3 |
| 6,385,608 B1 * | 5/2002 | Mitsuishi et al. .............. 707/6 |
| 6,473,757 B1 * | 10/2002 | Garofalakis et al. ........... 707/6 |
| 6,615,211 B2 * | 9/2003 | Beygelzimer et al. ......... 707/6 |
| 6,675,164 B2 * | 1/2004 | Kamath et al. ................ 707/6 |
| 6,697,791 B2 * | 2/2004 | Hellerstein et al. .......... 706/47 |
| 6,754,651 B2 * | 6/2004 | Nanavati et al. ............... 707/3 |

(Continued)

FOREIGN PATENT DOCUMENTS

WO    WO 00/20997    * 4/2000

(Continued)

OTHER PUBLICATIONS

Ling Feng et al. "A template model for multidimensional inter-transactional association rules", The VLDB, vol. 11, issue 2, Oct. 2002, pp. 153-175.*

(Continued)

*Primary Examiner*—Srirama Channavajjala
(74) *Attorney, Agent, or Firm*—Mark Wardas; Ryan, Mason & Lewis, LLP

(57) ABSTRACT

Attribute association discovery techniques that support relational-based data mining are disclosed. In one aspect of the invention, a technique for mining attribute associations in a relational data set comprises the following steps/operations. Multiple items are obtained from the relational data set. Then, attribute associations are discovered using: (i) multi-attribute mining templates formed from at least a portion of the multiple items; and (ii) one or more mining preferences specified by a user. The invention provides a novel architecture for the mining search space so as to exploit the inter-relationships among patterns of different templates. The framework is relational-sensitive and supports interactive and online mining.

9 Claims, 9 Drawing Sheets

| $T_1$ | $T_2$ | | $T_1$ | $T_2$ | | $T_1$ | $T_2$ | | $T_1$ | |
|---|---|---|---|---|---|---|---|---|---|---|
| $t_{11}:A$ | $t_{21}:B$ | $t_{22}:C$ | $t_{11}:A$ | $t_{21}:B$ | | $t_{11}:A$ | $t_{21}:C$ | | $t_{11}:B$ | $t_{12}:C$ |
| (a) $c = (A)(BC)$ | | | (b) $c_3 = (A)(B)$ | | | (c) $c_2 = (A)(C)$ | | | (d) $c_1 = (BC)$ | |

| $c = c_L \bowtie c_{L-1}$ | $c_L$ | $c_{L-1}$ | MERGE-JOIN? |
|---|---|---|---|
| (A)(A)(A) | (A)(A) | (A)(A) | YES |
| (A)(A)(B) | (A)(A) | (A)(B) | YES |
| (A)(AB) | (A)(A) | (A)(B) | NO |
| (AB)(B) | (AB) | (A)(B) | YES |
| (A)(B)(B) | (A)(B) | (A)(B) | YES |
| (B)(B)(B) | (B)(B) | (B)(B) | YES |

U.S. PATENT DOCUMENTS

| | | | |
|---|---|---|---|
| 6,763,354 B2* | 7/2004 | Hosken | 707/6 |
| 6,792,456 B1* | 9/2004 | Hellerstein et al. | 709/224 |
| 6,829,608 B2* | 12/2004 | Ma et al. | 707/6 |
| 6,832,216 B2* | 12/2004 | Shintani et al. | 707/2 |
| 6,836,894 B1* | 12/2004 | Hellerstein et al. | 719/318 |
| 6,907,426 B2* | 6/2005 | Hellerstein et al. | 707/6 |
| 6,996,551 B2* | 2/2006 | Hellerstein et al. | 706/48 |
| 7,139,764 B2* | 11/2006 | Lee | 707/100 |
| 2002/0103793 A1* | 8/2002 | Koller et al. | 707/3 |
| 2003/0014420 A1* | 1/2003 | Jessee et al. | 707/101 |
| 2003/0176931 A1* | 9/2003 | Pednault et al. | 700/31 |
| 2004/0049504 A1* | 3/2004 | Hellerstein et al. | 707/5 |
| 2004/0181519 A1* | 9/2004 | Anwar | 707/3 |

FOREIGN PATENT DOCUMENTS

| | | | |
|---|---|---|---|
| WO | WO 01/29692 | * | 4/2001 |
| WO | WO 02/103954 A2 | * | 12/2002 |
| WO | WO 03023654 A2 | * | 3/2003 |
| WO | WO 03/058504 | * | 7/2003 |
| WO | 2005/122008 | * | 12/2005 |

OTHER PUBLICATIONS

Do Heon Lee et al. "discovering databae summaries through refinements of fuzzy hypotheses", IEEE 1994, pp. 223-230.*

Jiawel Han et al. "Data Mining: Concepts and techniques", slides for textbook, chapter 6, 84 slides, Jan. 17, 2001, http://www.cs.sfu.ca.*

Alexander Tuzhilin et al "querying multiple sets of discovered rules", SIGKDD, Jul. 2, 2002.*

Sanjay Chawla et al. "mining open source software (OSS) data using association rules network technical report number 535", Feb. 2003, 12 pages.*

Francisco Guil et al. "TSET: an algorithm for mining frequent temporal patterns", no date, 10 pages.*

Mohammead Al Hasan et al, "DMTL: A generic data mining template library", no date, 11 pages.*

Moonjung Cho et al. "preference-based frequent pattern mining", no date.*

Cheng-Fa Tsai et al. "a new data clustering approach for data mining in large databases", proceedings international symposium on parallel architecture, algorithms and networks, 2002, pp. 278-283.*

Garofalakis,M et al. "mining sequential patterns with regular expression constraints", IEEE transactions on knowledge and data engineering, vol 4, issue: 3, June 2002, pp. 530-552.*

Mohammad,J Zaki, "scalable algorithms for association mining", IEEE transactions on knowledge and data engineering, vol 12, No. 3, 2000, pp. 372-390.*

Ming-Syan Chen, "using multi-attribute predicates for mining classification rules", computer software and applications confierence, COMPSAC,proceedings, twenty-second annual international conference, 1998, pp. 636-641.*

Bosc,P et al. "database mining for the discovery of extended functional dependencies", 18th international conference of the north america, Fuzzy information processing society, 1999, pp. 580-584.*

R. Agrawal et al., Mining Association Rules Between Sets of Items in Large Databases, VLDB, pp. 1-10, 1993.

R. Agrawal et al., Mining Sequential Patterns, ICDE, 12 pages, 1995.

R. Srikant et al., "Mining Generalized Association Rules," VLDB, 13 pages, 1995.

J. Han et al., "Discovery of Multiple-level Association Rules from Large Databases," VLDB, pp. 1-12, 1995.

R. Ng et al., Exploratory Mining and Pruning Optimizations of Constrained Associations Rules, SIGMOD, 12 pages, 1998.

R. Srikant et al., Mining Association Rules with Item Constraints, SIGKDD, 7 pages, 1997.

W-M Shen et al., "MetaQueries for Data Mining," pp. 1501-1521, AAAI/MIT press, 1996.

Y. Fu et al., "Meta-Rule-Guide Mining of Association Rules in Relational Databases," Proceedings 1st Int'l Workshop on Integration of KDOOD, 8 pages, 1995.

M. Kamber et al., Matarule-Guided Mining of Multi-Dimensional Association Rules Using Data Cubes, SIGKDD, 4 pages, 1997.

C. Grahne et al., "On Dual Mining: From Patterns to Circumstances, and Back," ICDE, pp. 1-10, 2001.

C-S. Perng et al., "A Framework for Exploring Mining Spaces with Mutiple Attributes," ICDM, pp. 449-456, 2001.

R. Agrawal et al., "Fast Algorithms for Mining Association Rules," VLDB, pp. 1-32, 1994.

* cited by examiner

| (REC) | TID | EVENT TYPE | CATEGORY | SOURCE | APPLICATION | HOST | SEVERITY |
|---|---|---|---|---|---|---|---|
| (1) | 1001 | TCPConnectionClose | NETWORK | IO | SYSTEM | VESUVIO | LOW |
| (2) | 1001 | CiscoDCDLinkUp | NETWORK | DHCP | ROUTING | ETNA | LOW |
| (3) | 1001 | AuditFailure | SECURITY | SOFTWARE | AUTHORIZATION | MAGNA | HIGH |
| (4) | 1001 | CoreDump | MEMORY | EXCEPTION | KERNEL 2.4 | STROMBOLI | HIGH |
| (5) | 1001 | IRQConflict | DEVICE | PCI BUS | SYSTEM | VULCANO | HIGH |

| $T_1$ | $T_2$ | |
|---|---|---|
| $t_{11}$:A | $t_{21}$:B | $t_{22}$:C |

(b) $c_3 = (A)(B)$

| $T_1$ | $T_2$ |
|---|---|
| $t_{11}$:A | $t_{21}$:B |

(c) $c_2 = (A)(C)$

| $T_1$ | $T_2$ |
|---|---|
| $t_{11}$:A | $t_{21}$:C |

(d) $c_1 = (BC)$

| $T_1$ | |
|---|---|
| $t_{11}$:B | $t_{12}$:C |

FIG. 6

| $c = c_L \bowtie c_{L-1}$ | $c_L$ | $c_{L-1}$ | MERGE-JOIN? |
|---|---|---|---|
| (A)(A)(A) | (A)(A) | (A)(A) | YES |
| (A)(A)(B) | (A)(A) | (A)(B) | YES |
| (A)(AB) | (A)(A) | (A)(B) | NO |
| (AB)(B) | (AB) | (A)(B) | YES |
| (A)(B)(B) | (A)(B) | (A)(B) | YES |
| (B)(B)(B) | (B)(B) | (B)(B) | YES |

FIG. 7

Methodology 1 HIFI(AttributeSet: $A$, Dataset: $D$, MinSupport: $min\_sup$)

1: generate frequent patterns for templates on the 1st level;
2: $L \leftarrow 2$;
3: $Template_L \leftarrow$ pair up templates on the 1st level to generate templates on the 2nd level;
4: $Cand_L \leftarrow$ join patterns on the 1st level to generate candidate patterns on the 2nd level;
5: while $Cand_L \neq \emptyset$ do
6:    countSupport($D$, $Cand_L$);
7:    eliminate candidates whose support are lower than $min\_sup$;
8:    $L \leftarrow L + 1$;
9:    $Template_L \leftarrow TemplateGen(Template_{L-1}, A)$;
10:   CandidateGen($Template_L$);
11: end while
12: return $\{t.patterns | t \in Template_L\}$;

FIG. 9

| | |
|---|---|
| Methodology 2 countSupport(Dataset: *D*, PatternSet: *candidates*) | |
| 1: | for each tuple $t \in D$ do |
| 2: | traverse the item tree to find all items supported by $t$; |
| 3: | for each *item* supported by $t$ do |
| 4: | record the current TID and RID in *item*'s occurrence buffer; |
| 5: | end for |
| 6: | if any occurrence buffer is full then |
| 7: | for each pattern $p \in candidates$ do |
| 8: | scan the occurrence buffer of each item in $p$ (scan is synchronized by TID), and increase the count of $p$ if each item of $p$ is supported by a different record (of the same TID); |
| 9: | end for |
| 10: | empty all occurrence buffers; |
| 11: | end if |
| 12: | end for |

FIG. 10

| Methodology 3 TemplateGen(SetOfTemplates: parentTemplates) |
|---|
| 1:   Templates ← ∅; |
| 2:   for each $p \in parentTemplates$ do |
| 3:     for each child template $c$ of $p$ do |
| 4:       Templates ← Templates ∪ {c} if all of $c$'s parent templates exist and have non-empty pattern set; |
| 5:       prune Templates using user preferences; |
| 6:     end for |
| 7:   end for |
| 8:   return Templates; |

FIG. 11

```
Methodology 4 CandidateGen(SetOfTemplates: Templates)
 1: for each c ∈ Templates do
 2:   Let c_i and c_j be the two parents of c that have the fewest number of patterns;
 3:   if joining c_L and c_{L-1} is less costly than joining c_i and c_j then
 4:     c.patterns ← mergeJoin(c_L, c_{L-1});
 5:   else
 6:     sort the patterns in c_i and c_j by their common attributes;
 7:     c.patterns ← mergeJoin(c_i, c_j);
 8:     sort the patterns in c.patterns;
 9:   end if
10:   prune c.patterns if c has value exclusion constraints;
11:   for each patent c_k of c, and c_k does not take part in the join operation do
12:     for each pattern p ∈ c.patterns do
13:       remove p from c.patterns if the sub-pattern of p with regard to c_k does not exists in c_k.patterns;
14:     end for
15:   end for
16: end for
```

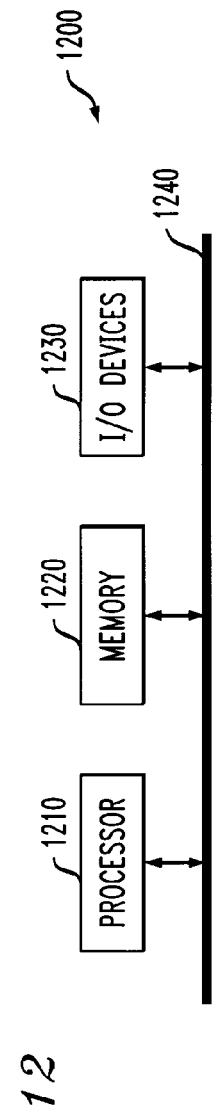

FIG. 12

METHODS AND APPARATUS FOR MINING ATTRIBUTE ASSOCIATIONS

FIELD OF THE INVENTION

The present invention relates generally to data processing techniques and, more particularly, to methods and apparatus for discovering attribute associations in data.

BACKGROUND OF THE INVENTION

The problem of mining (discovering) frequent itemsets in a set of transactions, wherein each transaction is a set of items, was first introduced in R. Agrawal et al., "Mining Association Rules Between Sets of Items in Large Databases, VLDB, pp. 207–216, 1993, the disclosure of which is incorporated by reference herein. Agrawal et al. also led the pioneering work of mining sequential patterns, see R. Agrawal et al., "Mining Sequential Patterns, ICDE, 1995, the disclosure of which is incorporated by reference herein. As is known, each item in a pattern is represented by a set of literals (e.g., a literal may be "beer" or "diaper," as in a "market basket" scenario), and patterns on level k (patterns with a total number of k literals) are generated by joining patterns on level k−1.

Unfortunately, user preferences can not be incorporated into the Agrawal et al. mining process. The methodology mines (unnecessarily) all frequent itemsets before the answers to mining targets of a user can be filtered out during the final step. Consideration of user preferences apparently slows down this mining process when the dataset is large and high-dimensional, and it also creates difficulty in understanding the mining results since patterns are all mixed together.

Further, Srikant et al. (see R. Srikant et al., "Mining Generalized Association Rules," VLDB, pp. 407–419, 1995, the disclosure of which is incorporated by reference herein) and Han et al. (see J. Han et al., "Discovery of Multiple-level Association Rules from Large Databases," VLDB, 1995, the disclosure of which is incorporated by reference herein) consider multi-level association rules based on item taxonomy and hierarchy. These approaches are further extended to handle more general constraints, see R. Ng et al., "Exploratory Mining and Pruning Optimizations of Constrained Associations Rules, SIGMOD, pp. 13–24, 1998, and R. Srikant et al., "Mining Association Rules with Item Constraints, SIGKDD, pp. 67–93, 1997, the disclosures of which are incorporated by reference herein.

Unfortunately, with a pre-specified hierarchy or taxonomy, the mining space is severely restricted. The ability to discover patterns depends totally on whether these patterns happen to fit into the given taxonomy or hierarchy.

Still further, Shen et al. developed meta-queries for Bayesian data clusters using templates expressed as second-order predicates, see W. Shen et al., "Meta-queries for Data Mining," pp. 375–398, AAAI/MIT press, 1996, the disclosure of which is incorporated by reference herein. Fu et al. (see Y. Fu et al., "Meta-rule-guided Mining of Association Rules in Relational Databases," Proceedings 1st Int'l Workshop on Integration of KDOOD, pp. 39–46, 1995, the disclosure of which is incorporated by reference herein) and Kamber et al. (see M. Kamber et al., "Meta-rule-guided Mining of Multi-dimensional Association Rules Using Data Cubes, SIGKDD, pp. 207–210, 1997, the disclosure of which is incorporated by reference herein) extend meta-queries to relational databases and multi-dimensional data cubes, respectively. Since meta-rules are viewed as rule templates expressed as a conjunction of predicates instantiated on a single record, they do not consider multi-attribute patterns formed from multiple records.

More recently, there has been work on different kinds of multi-attribute mining circumstances (see G. Grahne et al., "On Dual Mining: From Patterns to Circumstances, and Back," ICDE, 2001, the disclosure of which is incorporated by reference herein) and dynamic groupings (see C.-S. Perng et al., "A Framework for Exploring Mining Spaces with Multiple Attributes," ICDM, 2001, the disclosure of which is incorporated by reference herein), where arbitrary sets of attributes are used to group items into transactions.

However, a need exists for attribute association discovery techniques that support relational-based data mining that overcome the above and other deficiencies.

SUMMARY OF THE INVENTION

The present invention provides attribute association discovery techniques that support relational-based data mining.

In one aspect of the invention, a technique for mining attribute associations in a relational data set comprises the following steps/operations. Multiple items are obtained from the relational data set. Then, attribute associations are discovered using: (i) multi-attribute mining templates formed from at least a portion of the multiple items; and (ii) one or more mining preferences specified by a user.

The multi-attribute mining templates may be related by an anti-monotonicity property. The one or more mining preferences specified by the user may comprise specification of at least one of: (i) one or more desired multi-attribute mining templates; (ii) one or more irrelevant multi-attribute mining templates; and (iii) one or more rules concerning values of attributes in the multi-attribute mining templates.

The attribute association discovering step/operation may further comprise generating candidate patterns at a template level. The candidate pattern generating step/operation may further comprise deriving candidate patterns of multi-attribute mining templates by merge-joining patterns of nodes of at least a portion of the templates without pre-sorting. Further, the candidate pattern generating step/operation may further comprise maintaining one or more occurrence buffers to count occurrences of patterns. Still further, the attribute association discovering step/operation may further comprise pruning candidate patterns at a template level.

Advantageously, the invention provides a novel architecture for the mining search space so as to exploit the inter-relationships among patterns of different templates. The framework is relational-sensitive and supports interactive and online mining. Unlike traditional methods that find all frequent itemsets, the invention enables a user to ask more specific queries on attributes. Experiments on synthetic and real world datasets show that, by exploiting the new properties provided in accordance with the invention, execution times for mining can be reduced significantly.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 5(a) through 5(d) are tables illustrating patterns using relational schema according to an embodiment of the present invention;

FIG. 6 is a table illustrating candidate patterns according to an embodiment of the present invention;

FIG. 7 is a flow diagram illustrating a HIFI mining methodology according to an embodiment of the present invention;

FIG. 9 is a flow diagram illustrating a pattern occurrence count methodology according to an embodiment of the present invention;

FIG. 10 is a flow diagram illustrating a pattern template generation methodology according to an embodiment of the present invention;

FIG. 11 is a flow diagram illustrating a candidate generation methodology according to an embodiment of the present invention; and FIG. 12 is a block diagram illustrating a generalized hardware-architecture of a computer system suitable for implementing a system for discovering attribute associations according to the present invention.

DETAILED DESCRIPTION OF PREFERRED EMBODIMENTS

Figures 1, 2:
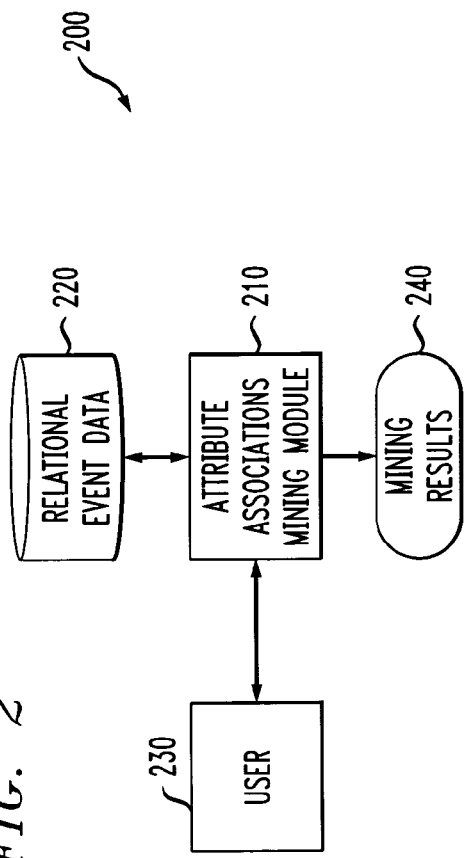
FIG. 1 is a table illustrating a simple example of an event database with which the present invention may be employed.
FIG. 2 is a block diagram illustrating a data mining system according to an embodiment of the present invention.

The present invention will be described below in the context of an exemplary application comprising the mining of event data relating to system management functions. The system being managed may be elements of a distributed processing network. However, it is to be understood that the invention is not limited to use with any particular application domain but is rather more generally applicable for use in accordance with any application domain (e.g., system management, process control, manufacturing, to name a few examples) in which it is desirable to discover attribute associations in data generated in accordance with the application domain and stored in relational form.

Thus, the invention realizes the need for methodologies to support relational data mining, as a majority of datasets in the real world are stored in the relational form, or generated on the fly by other query tools (e.g., Online Analytical Processing or OLAP tools) in the relational form.

It is to be appreciated that an item can be described by a set of attributes. For instance, in accordance with a system management domain, a system event can be described by attributes such as EVENTTYPE, CATEGORY, SOURCE, APPLICATION, HOST, SEVERITY, and TIME. Interesting association rules, such as "TCPConnectionClose (EVENT) from Vesuvio (HOST) often occurs together with AuditFailure (CATEGORY) during Authorization (APPLICATION)," often relate to items described only by a subset of these attributes.

Patterns composed of multi-attribute items are often more interesting and informative because their varied composition enables them to represent concepts at all possible granularity levels. We regard such items as a projection of a real item onto a subset of its attributes, and call them attribute-projection-based items, or AP-items. For instance, the AP-items in the rule mentioned above are "embedded" in the dataset shown in FIG. 1, which contains five events during a certain time interval. These events also support the following patterns:

$R_1$: TCPConnectionClose occurs on Vesuvio.

$R_2$: Memory problems on Stromboli tend to occur with IRQConflict event on Vulcano.

$R_3$: Security AuditFailure tends to occur with DHCP CiscoDCDLinkUp.

$R_4$: Network Routing problems tend to occur with Kernel 2.4 troubles.

$R_5$: PCI Bus failures tend to coincide with other System problems.

The principles of the invention associated with mining frequent itemsets in event databases address some interesting issues and challenges.

Exponential Search Space. Multi-attribute items incur a huge search space. The AP-item in $R_1$ is defined by a subset of attributes: {Host, EventType}. Indeed, any subset of attributes can be used to define an AP-item. This introduces a combinatorial challenge: in a dataset with N attributes there are $2^N-1$ different ways to define an AP-item. Besides, there are a plethora of ways to combine AP-items to form interesting patterns. $R_2, \ldots, R_5$ combine concepts on different levels to form patterns. This introduces another combinatorial challenge: an itemset with k AP-items can be formed in as many as $$\binom{2^N + k - 2}{k}$$

different ways.

Dynamic Data. The patterns embedded in the event data, unlike supermarket purchasing patterns, which are more or less stable over the subject time, are constantly evolving as old problems in the system are being solved, and new types of problems are being generated. The mining methodologies should focus on newly generated data instead of the entire history archive. Furthermore, we often need to mine data streams generated on the fly by other query tools, such as OLAP, which requires the mining methodologies to be relational-sensitive, as it is often inefficient and unnecessary to first convert the data to a mining format, then discover all frequent itemsets among them, and finally filter out the answers to the queries. The dynamic nature of the data prevents us from running a mining methodology once and for all, and saving the results for future analysis.

User Preferences. Traditional association rule methodologies return all frequent itemsets. However, the user may only be interested in some specific mining targets according to his domain knowledge and the current focus of study for a given dataset. For instance, a user wants to mine all patterns where EVENTTYPE and SOURCE are involved in describing the patterns. At the same time, he wants to ignore patterns which contain elements described by both the SOURCE and CATEGORY attributes. Furthermore, he wants to preclude all mining tasks which contain elements whose CATEGORY is Security and whose HOST belongs to the ibm.com domain. Note that such user preferences cannot be enforced by preprocessing the data to exclude certain attributes or values, as these attributes and values may combine in different ways to form patterns that are interesting to the user.

In accordance with the present invention, a mining framework that meets the above and other challenges is explained herein. We refer to the inventive mining framework as the HIFI (heterogeneous items in frequent itemsets) framework. The framework ensures maximum information sharing during the mining process.

The framework is also conducive to incorporating user preferences for efficient mining, and mines multi-attribute datasets directly without encoding the data. It is to be appreciated that in traditional approaches for frequent itemset mining, an item is a literal, for instance, "beer" or "diaper." In the case of the invention, each item is described by a set of attributes. Thus, to use traditional approaches, we would have to encode each item into a literal. The encoding, of course, would shadow the semantics of the multiple attributes, their meanings and inter-relationships, and user preferences would not be exploited in the methodology. Hence, encoding would create problems in both runtime performance and final interpretation.

Thus, the inventive approach does not require encoding the data. Instead, the invention fully utilizes the semantics of the multi-attributes of each item. Itemsets are organized by templates, which comprise a set of attributes. The methodology takes advantage of the downward closure property among different templates and improves the runtime performance. Since no encoding is involved, interpretation is straightforward.

Referring now to FIG. 2, a data mining system according to an embodiment of the present invention is illustrated. As shown, data mining system 200 comprises an attribute association mining module 210 that is responsive to relational event data, 220 (e.g., from event database shown in FIG. 1) and input from user 230 (e.g., user preferences as described in detail below). In general, mining module 210 performs mining methodologies in accordance with the HIFI framework based on at least a portion of the relational event data and user input, as described in detail herein, and outputs mining results 240.

The inventive mining approach introduces the concept of a mining template to identify particular forms of attribute associations. For instance, pattern $R_1$ is an instance of template (EVENTTYPE, HOST), as $R_1$ contains a single item described by two attributes, EVENTTYPE and HOST. Similarly, pattern $R_2$ is an instance of template (CATEGORY; HOST) (EVENTTYPE, HOST), as it contains two items each described by a set of attributes. Under traditional association rule mining, each item can be viewed as having only one attribute, item name, so there is no need to define templates based on attributes.

Multi-attribute association mining, according to an illustrative embodiment of the invention, centers around attribute templates because: (i) once candidate generation and pruning are localized to each template, mining performance can be improved; and (ii) user preferences can be incorporated into the mining process. A user can specify desired mining templates and irrelevant mining templates by using a rule-like language. As a result, the search space can often be reduced significantly. The inventive framework also provides a foundation for domain knowledge-based data mining.

In accordance with an illustrative embodiment of the invention, templates in the HIFI framework are related by the anti-monotonicity property (or the so-called downward closure property). This property not only holds when mining top-down from k-itemsets to (k+1)-itemsets, it also holds when mining AP-items defined by a set of k attributes to AP-items defined by k+1 attributes. Working together, they provide a rich set of relationships among itemsets formed in different ways. The inventive approach ensures all such relationships are exploited to the full extent. Given a k-itemset, each item i defined by $N_i$ attributes, we show that it has $\Sigma_i^k N_i$ parent itemsets. The anti-monotonicity property holds between each parent and child itemsets, based on which, candidate patterns can be pruned efficiently. We also show that candidate patterns of most templates in the graph can be derived by merge-joining patterns of two of their parent nodes without pre-sorting, thus avoiding expensive pattern generation methods that require sorting.

Lastly, the effectiveness of association rule mining is often limited by the difficulty in interpreting the numerous rules it produces. Our restructured search space provides us an organized view of the resulting frequent itemsets.

Before explaining illustrative details of mining methodologies of the invention, some definitions and notations that may be used in the explanations are now provided.

Let D be a set of transactions, where each transaction contains a set of records, and each record is defined by a set of attributes A. Our task is to find frequent k-itemsets.

Let $T=\{t_1, \ldots, t_k\}$ be a subset of A. An attribute-projection-based item, or AP-item I is denoted by $\{t_1=v_1, \ldots, t_k=v_k\}$, where $v_i$ is a value in the domain of attribute $t_i$. We call T the relevant attributes of AP-item I.

We begin with an example based on the event management data in FIG. 1. An example of an AP-item is {CATEGORY=Security}, which is defined by its relevant attribute {CATEGORY}. AP-Items can be based on multiple attributes, for instance, {CATEGORY=Security, SEVERITY=High} is an AP-item defined by relevant attributes {CATEGORY, SEVERITY}. We use <security, high> for simplicity when no confusion arises.

A record R is an instance of an AP-item $I=\{t_1=v_1, \ldots, t_k=v_k\}$, if $R.t_i=v_i, \forall t_i \in \{t_1, \ldots, t_k\}$.

If R is an instance of AP-item I, then $\forall I' \subseteq I$, R is an instance of I'.

A pattern X is a set of AP-items. A k-itemset pattern is a pattern containing k AP-items.

Let $i_1$ and $i_2$ be two AP-items. Pattern $\{i_1, i_2\}$ is different from pattern $\{i_1 \cup i_2\}$, the former being a 2-itemset pattern, the latter a 1-itemset pattern.

A transaction S supports pattern X, if each AP-item $I \in X$ maps to a unique record $R \in S$ such that R is an instance of I. Pattern X has support s in dataset D if s% of the transactions in D support X.

We continue our example from FIG. 1. Record (2) is an instance of AP-item $i_1$: {SOURCE=DHCP}, and an instance of AP-item $i_2$: {HOST=Etna}, which makes it an instance of AP-item $i_3=i_1 \cup i_2$: {SOURCE=DHCP, HOST=Etna} as well. Also, we can see that record (3) is an instance of AP-item $i_4$: {HOST=Magna}. Thus, we derive some of the 2-itemset patterns supported by transaction 1001 (the first 5 records): $\{i_1 i_4\}$, $i\{i_2, i_4\}$, and $\{i_3, i_4\}$.

However, transaction 1001 does not support 2-itemset pattern $\{i_1, i_2\}$. This is because $i_1$ and $i_2$ are supported by one record and one record only in transaction 1001. According to the definition, in order to support $\{i_1, i_2\}$, the transaction needs to have at least two records that are instances of $i_1$ and $i_2$ respectively.

We define a pattern template c as a multi-set, $c=\{T_1, \ldots, T_k\}$, where each $T_i$ is a non-empty set of attributes. A pattern in template c has the form $p=\{I_1, \ldots, I_k\}$, where the relevant attributes of item $I_i$ is $T_i$.

For presentation simplicity, we use parenthesis to separate each $T_i$ in a pattern template. For instance, assuming A, B and C are 3 of the attributes in a dataset, we use (A)(AB)(C) to represent a pattern template $c=\{T_1, T_2, T_3\}$, where $T_1=\{A\}$, $T_2=\{A, B\}$, $T_3=\{C\}$. This notation is used in FIG. 3.

Note that (A)(B) and (AB) are two different templates: (A)(B) is a template of patterns having two items, which are described by attribute A and B respectively; while (AB) is a template for patterns having only one item, which is described by attributes A and B at the same time.

A summary of the notations used herein is as follows:
D Relational dataset to be mined;
A Attributes of D;
T A subset of A, T is used to define an AP-item;
c A pattern template, defined as $c=\{T_1, \ldots, T_k\}$;
L Level of pattern template $c=\{T_1, \ldots, T_k\}$, defined as $L=\Sigma_{i=1}^{k}|T_i|$, in the HIFI search space;
$\vec{T}$ A sequence resulted by ordering the attributes in T;
$\vec{c}$ An ordered representation of c, defined as $\vec{c} = \langle \vec{T}_1, \ldots, \vec{T}_k \rangle$;
$c_i$ (or $\vec{c}_i$) A parent template of c, derived by removing the i-th attribute in $\vec{c}$; and
$c.t_{ij}$ (or $\vec{c}.t_{ij}$) c's column defined by the j-th attribute of $T_i \in c$.

We now turn to a detailed description of an illustrative embodiment of the HIFI framework.

If there is only one attribute (N=1), then any k-itemset has only one pattern template, and the problem of attribute association degenerates to the problem of traditional association rule mining. However, it can be shown that the search space grows exponentially when N increases. That is, given a dataset with N different attributes, there is a total of $$\binom{2^N + k - 2}{k}$$

different pattern templates of size k.

To handle such a huge search space, the relationships among different pattern templates is explored. For instance, pattern template (AB) is a specification of template (A) and template (B). The HTFI framework explores these links by defining the successor/predecessor relationships.

Figure 3:
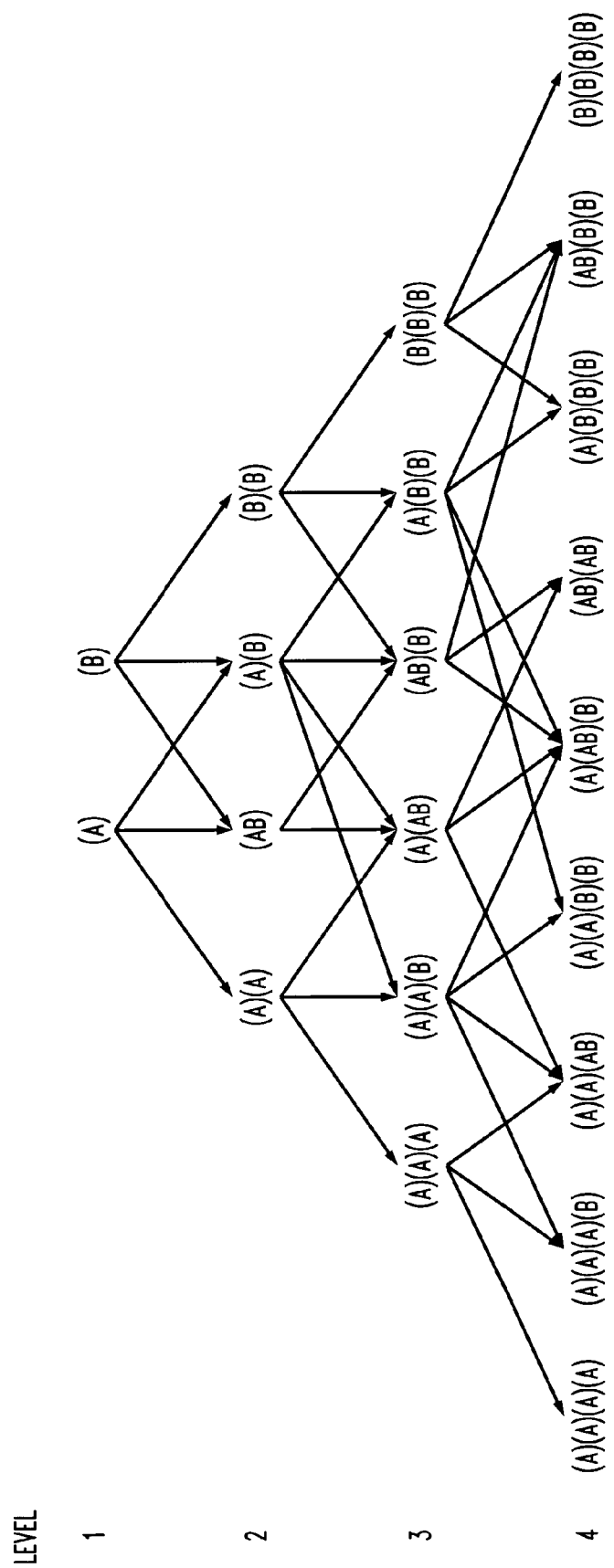
FIG. 3 is a diagram illustrating a mining space of a HIFI (heterogeneous items in frequent itemsets) framework according to an embodiment of the present invention.

Given a pattern template $c=\{T_1, \ldots, T_m\}$, and an attribute $t \in A$, then c's immediate successors are in one of the following forms:
1. $\{T_1, \ldots, T_m, T_{m+1}\}$, where $T_{m+1}=\{t\}$
2. $\{T_1, \ldots, T_j \cup \{t\}, \ldots, T_m\}$, $t \notin T_j$ FIG. 3 depicts a graph of pattern templates tightly coupled by the predecessor/successor relationships for two attributes A and B. Note the following: A pattern template $c=\{T_1, \ldots, T_m\}$ on level L has no more than L predecessors, where level L is defined as $L=\Sigma_{i=1}^{m}|T_i|$, that is, the total number of attributes that appear in the relevant attributes of c.

Benefits of structuring the search space in the level-wise, tightly coupled form are the following:

(i) The framework reveals all the relationships among pattern templates. These relationships are essential for candidate generation and pruning.

(ii) Instead of joining the entire frequent itemsets on level K to derive itemsets on level K+1 and then using the entire itemsets again for pruning, the candidate generation and pruning procedure can be localized for each pattern template. For instance, in order to find frequent patterns for (A)(A)(B) and (A)(B)(B), only 4 nodes (their predecessors) in FIG. 3 need to be explored. The improvement in performance is most significant in mining high dimensional data since the search space grows exponentially as the number of attributes increases. Standard association rule mining and its extensions such as sequential patterns perform candidate generation and pruning at the entire level, thus they can not support demand-driven or online mining, as does the present invention.

(iii) The framework requires no data encoding. Each template represents a query pattern and more importantly, the frequent itemsets are also structured in the same form. Following the links among the templates, users can choose to have a more general or a more specific view of the rules. It helps users to overcome the difficulty in interpreting and analyzing the results.

We now describe the downward closure property. The extended downward closure property, which holds between each pair of parent and child templates, enables us to eliminate candidate patterns.

Downward Closure Property. Suppose $p=\{I_1, \ldots, I_k\}$ is a pattern of template c, and the support of pattern p is less than min_sup, then:

1. the support of pattern $p_a=\{I_1, \ldots, I_k, I_a\}$, where $I_a$ is an arbitrary item, is less than min_sup;
2. the support of pattern $p_b=(I_1, \ldots, I_{k-1}, I_b)$, where $I_b \supset I_k$; is less than min_sup.

The organization of the search space in FIG. 3 is justified by the above property. It is clear that the level-wise A priori property (see R. Agrawal et al., "Fast Algorithms for Mining Association Rules," VLDB, 1994, the disclosure of which is incorporated by reference herein) has been broken down to a much finer granularity, i.e., the template level. It enables us to localize candidate generation and pruning for specific templates.

Before mining patterns for each template, the template space is mined by applying user preferences.

According to an illustrative embodiment, the data mining system of the invention considers three types of user preferences. However, the system is easily expandable to include new types of preferences.

(i) Target Inclusion. The user specifies a set of templates that he wishes to include in the mining. Example: P1. Include all templates which involve attributes A and B.

(ii) Target Exclusion. The user specifies a set of rules to exclude certain templates. Example: P2. Exclude all templates where attributes A and B are used together to describe one of the items.

(iii) Value Exclusion. The user specifies a set of rules concerning the values of attributes in the templates. Example: P3. Exclude all patterns which contain (A=a)(B=b), and $a \in \{a_0, a_3\}$ and $b \in \{b_2, b_3\}$.

User preferences can be expressed in a Prolog-like language, although the invention is not limited thereto. The order in which inclusion and exclusion rules are applied may affect the final search space. If a template is excluded, then all of its descendents are also excluded; if a template is affected by certain value exclusion rules, then all of its descendents are affected by the same rules. As a result, if a template is not eliminated by the exclusion rules, then none of its predecessors are eliminated. This is an important property since candidate generation and pruning for the template depends on patterns of its predecessors.

Figure 4:
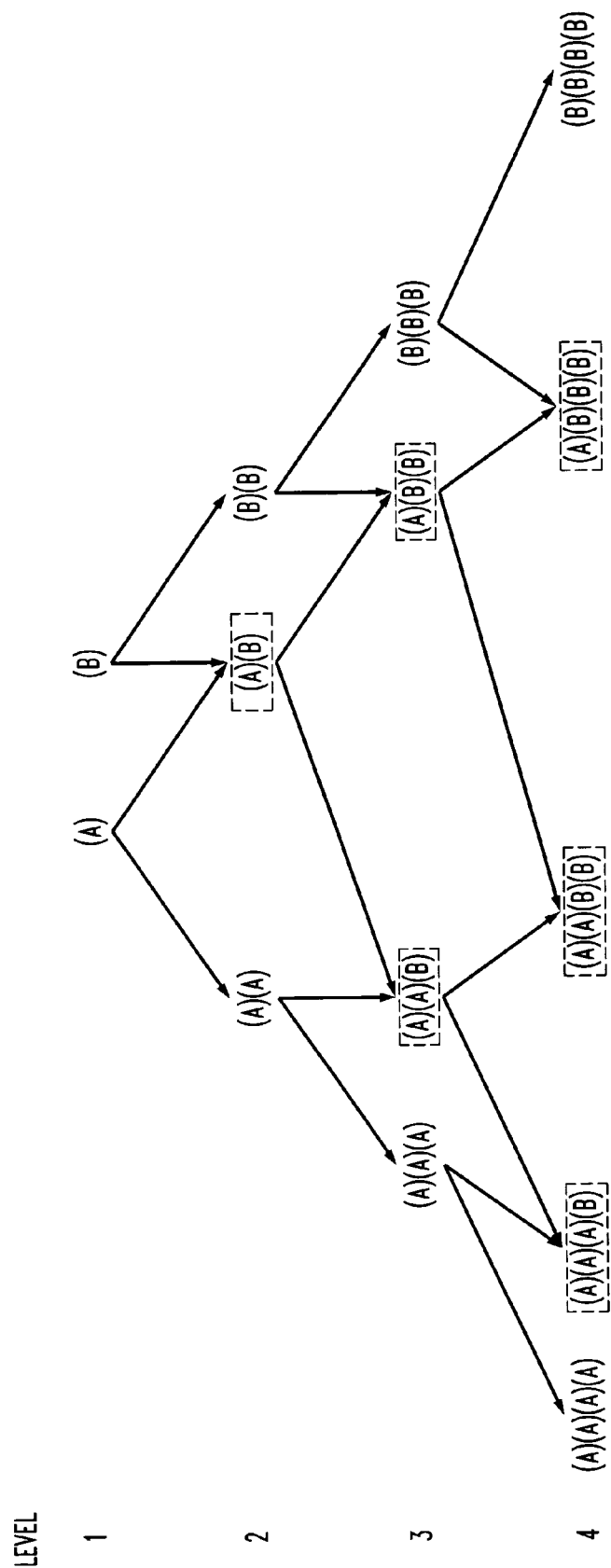
FIG. 4 is a diagram illustrating a mining space of a HIFI framework after applying user preferences according to an embodiment of the present invention.

In FIG. 4, we show the search space after applying user preferences P1, P2, and P3. Templates with value exclusion constraints are marked with a dotted box.

In traditional association rule mining, all templates are of the form (A)(A) . . . (A), and candidate k-item patterns can be generated by merge-joining (k−1)-item patterns efficiently. As shall be seen, merge-join is still an efficient way of generating candidate patterns for the HIFI framework when applicable. We first show that a template's candidate patterns can be generated by joining the patterns of any two of its predecessors. Although any pair of predecessors can be used, the computational cost can be very different. It depends upon the nature of the join operation. We identify a specific type of join, referred to as simple join, which can be implemented efficiently if the patterns are sorted in certain order. We then examine the conditions that can lead to merge-joins without pre-sorting.

To facilitate further discussions, we assume there exists an order (e.g., alphabetical order) among the attributes in A. Given a set of attributes $T \subseteq A$, we use $\vec{T}$ to denote the ordered sequence of the same attributes. Assuming $\vec{T}_1$ and $\vec{T}_2$ are two such sequences, we say $\vec{T}_1 \preceq \vec{T}_2$ if $\vec{T}_1$ holds lexicographical precedence over $\vec{T}_2$. Thus, we can uniquely represent a template c by its ordered version $\vec{c} = \langle \vec{T}_1, \ldots, \vec{T}_k \rangle$, where $\vec{T}_1 \preceq, \ldots, \preceq \vec{T}_k$. FIG. 3 shows each pattern template using the ordered representation, assuming alphabetical order among the attributes, i.e., A≺B.

Now, given a pattern template $\vec{c}$ on level L, $\vec{c} = \langle \vec{T}_1, \ldots, \vec{T}_k \rangle$, the patterns of c can be represented by a table with L columns: $\langle t_{11}, \ldots, t_{21}, \ldots, t_{k1}, \ldots \rangle$, where $\langle t_{i1}, \ldots \rangle$ is the (ordered) attributes of $\vec{T}_i$. We use $\vec{c}.t_{ij}$ to denote the column defined by the j-th attribute of $\vec{T}_i$, and we use $c_k$ to denote a parent template of c resulted from taking out the k-th column from $\vec{c}$. For instance, the patterns of template c=(A)(BC) are represented by a table of three columns as shown in FIG. 5(a), while the patterns of its three parent templates are represented by tables of two columns as shown in FIGS. 5(b), 5(c) and 5(d).

We now show how patterns in parent templates can be joined to produce patterns in child templates. To generate the candidate patterns of template (A)(BC), we can join the patterns of its parents $c_3$ and $c_1$ as follows:

EXAMPLE 1

Join $c_3$=(A)(B) and $c_1$, =(BC) to derive c=(A)(BC)

SELECT $c_3.t_{11}$, $c_3.t_{21}$, $c_1.t_{12}$
FROM $c_3$, $c_1$
WHERE $c_3.t_{21}=c_1.t_{11}$

However, not all join operations can be expressed as succinctly. For example, to generate all possible patterns of (A)(AC) by joining $c_3$=(A)(A) and $c_1$=(AC), we will have to use the following SQL (Structured Query Language):

EXAMPLE 2

Join $c_3$=(A)(A) and $c_1$=(AC) to derive c=(A)(AC)

SELECT CASE WHEN $c_1.t_{11}=c_3.t_{11}$
THEN $c_3.t_{21}$ ELSE $c_3.t_{11}$ END CASE,
$c_1.t_{11}$,
$c_1.t_{12}$
FROM $c_1$, $c_3$
WHERE $c_1.t_{11}=c_3.t_{11}$ OR $c_1.t_{11}=c_3.t_{21}$

The reason of the complexity is because of the following: if $p=\langle a_0 \rangle \langle a_1 \rangle$ is a pattern of (A)(A), then patterns derived from p for (A)(AC) can have two alternative forms: $\langle a_0 \rangle \langle a_1,* \rangle$ and $\langle a_1 \rangle \langle a_0,* \rangle$. Thus, in the join condition, we need to compare attribute A of $c_1$ to both attributes of $c_3$. We show later that such join operations can be avoided.

We now show that the above join operations are complete, meaning that the result of the join contains all the patterns that have a support greater than min_sup.

Join Property I. Given a template c on level L, L≧2, the candidate patterns derived by joining the patterns of any of its two predecessor templates contain all the frequent patterns of c.

This may be proven as follows. Let p be a pattern of template c, and let $c_i$, and $c_j$ be any two parents of c. Removing the i-th column and then the j-th column of p, we get two subpatterns, $p_i$ and $p_j$. Since p is a pattern of c, according to the anti-monotonicity property, $p_i$ and $p_j$ must be patterns of $c_i$ and $c_j$ respectively. Thus, pattern p can be derived by joining $p_i$ and $p_j$ on their common columns.

Join Property I also implies that joining the patterns of a template's immediate predecessors generates fewer candidates than joining its ancestors. This is because the patterns of its predecessors are a subset of the join results of the predecessors' predecessors.

According to Join Property I, for any pattern template on level L, L≧2, we can generate its candidate patterns by joining the patterns of any of its 2 predecessors. Other predecessors can be used to further prune the candidate patterns according to the anti-monotonicity property.

A goal is to generate candidates efficiently through a join operation such as Example 1, without indexing or sorting. We denote join operations in Example 1 as joins in the simple form, while join operations in Example 2 with a disjunctive WHERE condition in the non-simple form. Joins in the simple form can be implemented efficiently if the patterns are stored by a certain order. For instance, Example 1 can be implemented efficiently if patterns in $c_3$ and $c_1$ are ordered by attribute B.

It is harder to implement the join operation in Example 2 efficiently because two indices on table $c_3$ are required: one on column $t_{11}$, the other on $t_{21}$; otherwise we have to do a linear scan on table $c_3$. Assuming $c_1$ is ordered/indexed by $t_{11}$, for each tuple of $c_3$, check if there is a tuple in $c_1$ that satisfies the join condition using the order/index. Since patterns are generated on the fly, maintaining extra index is expensive.

Given a template c and any of its two parents $c_i$ and $c_j$, it is easy to check if patterns of c can be derived by joining $c_i$ with $c_j$ in the simple form. Assume c={$T_1, \ldots, T_k, \ldots, T_n$} and parent $c_i$={$T_1, \ldots, T'_k, \ldots, T_n$}, where $T_k = T'_k \cup \{A\}$. We call $c_i$ a simple parent of c, if $T_i \neq T'_k$, $\forall T_i \in C$.

Patterns of template c can be derived by joining $c_i$ and $c_j$ in the simple form, if both $c_i$ and $c_j$ are simple parents of c.

Join Property II. Given a template c on level L, there exist at least two predecessor templates, $c_i$ and $c_j$, that can be joined in the simple form to generate patterns for c.

This may be proven as follows. Assuming $\vec{c} = \langle \vec{T}_1, \ldots, \vec{T}_k \rangle$, $|T_1|=m$, and $|T_k|=n$, we show that $c_m$ and $c_{L-n+1}$ can be joined in the simple form. Given $|T_1|=m$, $c_m$ is the parent template of c after removal of the last attribute of $\vec{T}_1$. Assuming the removal of the last attribute of $\vec{T}_1$, results in a new sequence of attributes, T', we have either T'=∅, or $\vec{T}' \prec \vec{T}_1 \preceq, \ldots, \preceq \vec{T}_k$, which means there can be no $T_i \in c$ such that $T'=T_i$. Similar reasoning applies to $c_{L-n+1}$, which is the parent template of c after removing of the first attribute of $\vec{T}_k$. Since m+n≦L, we know m≠L−n+1, $c_m$ and $c_{L-n+1}$ can be joined in the simple form.

Assume patterns in a template are ordered by their attributes (i.e., patterns in (AB)(CD) are ordered by A, then B, C, and D). A template's patterns derived by merge-joining patterns of its two predecessors using their existing order keep the order. Thus, the new patterns can be used to merge-join with other patterns to derive patterns on the next level, which still keep the order. We can repeat this process to generate patterns on all levels through merge-joining without pre-sorting the data.

For instance, say we want to derive the candidate patterns for template (AB)(CD)(EF) on level 6. These can be generated by joining the patterns of $c_6$=(AB) (CD)(E) and $c_5$=(AB)(CD)(F). We can merge-join $c_6$ and $c_5$ because they share the same prefix: (AB)(CD) of length 4. Furthermore, the results of the join are still ordered by the attributes, which makes them ready to generate patterns on the next level without sorting. However, a question is whether every template can be derived by merge-joining two of its parents using their existing order.

Apparently, the parents that can possibly be merge-joined to produce the patterns of c must have the same first (L−2) attributes. Thus, the only two parents that can possibly qualify are $c_L$ and $c_{L-1}$, the two templates resulted by the removal of the last and the next-to-last column of c respectively. However, sometimes $c_L$ and $c_{L-1}$ do not have the same first L−2 attributes. Take $\vec{c}$ =(AB)(AB) on level L=4 for example. Parent template $\vec{c}_4$ does not exist in the form of (AB)(A), but rather (A)(AB) since (A)≺(AB). Thus, patterns of $\vec{c}_4$ are not ordered by the same first L−2=2 attributes as $\vec{c}_3$=(AB)(B). On the other hand, even if $c_L$ and $c_{L-1}$ do share the first L−2 attributes, they are not merge-joinable, if they can not even be joined in the simple form. An example of such a case is (A)(AB).

Join Property III. The candidate patterns of a template c on level L≧3 can be derived by merge-joining the patterns of $c_L$ and $c_{L-1}$, if the following conditions are satisfied: (i) $c_L$ and $c_{L-1}$ can be joined in the simple form; and (ii) $c_L$ and $c_{L-1}$ share the same first L−2 attributes.

This may be proven as follows. Condition (i) guarantees only a single ordering of the patterns is required, and condition (ii) guarantees they can be merge-joined.

In FIG. 6, we show parents $c_L$ and $c_{L-1}$ of each pattern template on level L=3 in FIG. 3. It shows that the candidate patterns of 5 out of the 6 templates can be derived by merge-joining the patterns of their parents without pre-sorting. It can be shown that, overall, around 80 percent of the templates can be derived by merge-join.

We now provide an illustrative explanation of mining methodologies according to the HIFI framework of the invention. That is, the following description presents an efficient implementation based on the properties discussed above.

The main procedure for mining the HIFI framework is provided in methodology 1 of FIG. 7. The following explanation of methodology 1 of FIG. 7 will be referenced by line numbers 1 through 12.

The methodology starts, at line 1, by generating frequent itemsets on the first level, where each pattern template has only one attribute. In lines 2 through 4, the resulted frequent patterns are paired to generate candidate patterns on the second level. For instance, if $\langle a_1 \rangle$ and $\langle b_1 \rangle$ are frequent patterns of template (A) and (B) on the 1st level; then $\langle a_1, b_1 \rangle$ and $\langle a_1 \rangle \langle b_1 \rangle$ are candidate patterns of template (AB) and (A)(B) on the 2nd level.

Then, a loop is executed in accordance with lines 7 through 11.

On line 6, the dataset is scanned to count the occurrences of each pattern on the current level (as illustrated in more detail in accordance with methodology 2 of FIG. 9), and on line 7, infrequent patterns are eliminated. Next, all possible pattern templates are generated for the next level (as illustrated in more detail in accordance with methodology 3 of FIG. 10) and each pattern template is populated by candidate patterns by the joining method described above (as illustrated in more detail in accordance with methodology 4 of FIG. 11). The loop is repeated until no more patterns can be generated.

In summary, it is to be understood that line 12 of FIG. 7 outputs frequent patterns of each pattern template. The templates are generated on line 3 and line 9. Patterns that conform with each template are counted on line 6 and filtered on line 7. The remaining patterns are the frequent ones, and they are output on line 12.

Given all candidate patterns on a certain level, the count-Support procedure shown in methodology 2 (FIG. 9) scans the dataset once to count the occurrences of each pattern. The counting itself is not a trivial problem, especially when "exclusive" concepts are to be supported, which requires checking whether each item of a given pattern is supported by a different record in a transaction. Efficient access to all valid items are essential for this purpose. In HIFI, the system builds an item tree for this task.

Figure 8:
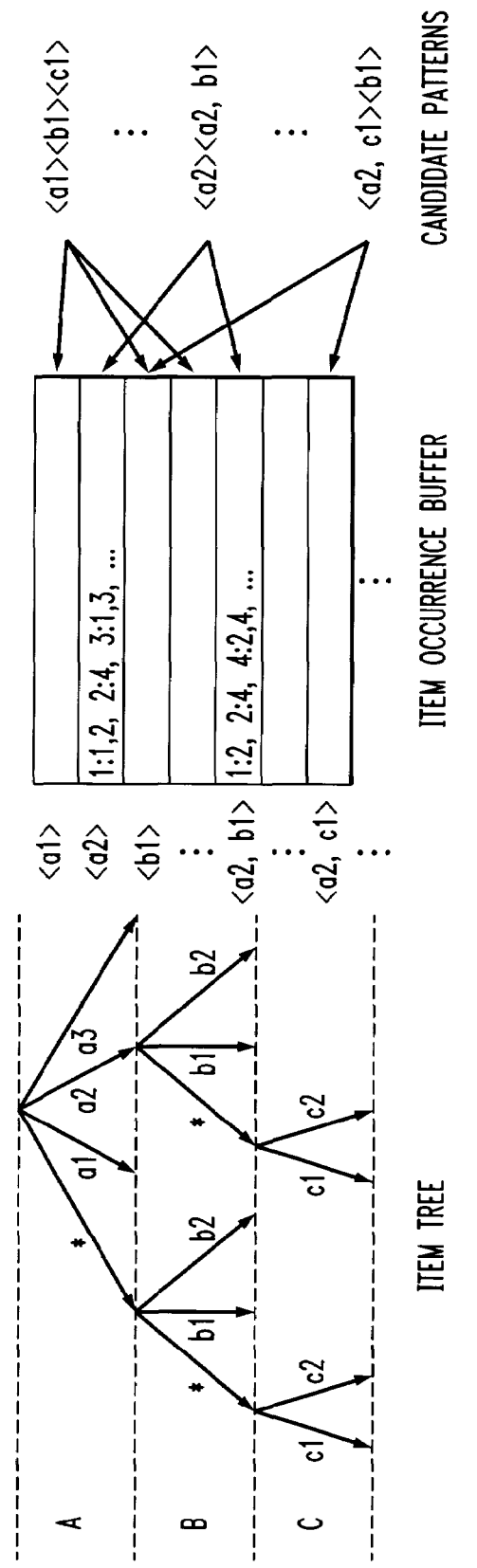
FIG. 8 is a diagram illustrating an item tree, an item occurrence buffer and candidate patterns according to an embodiment of the present invention.

FIG. 8 shows an item tree for a dataset with three attributes: A, B, and C. The edges on the first level of the item tree corresponds to values of attribute A, and edges on the second level corresponds to values of attribute B, and so on. Star '*' is a special symbol indicating a don't care value. Each node of the item tree, except for those pointed to by edges labeled with '*', corresponds to a valid item, i.e., an item that appears in at least one candidate pattern. For instance, the leaf nodes of the item tree shown in FIG. 8 represent the following items: $\langle c1 \rangle$, $\langle c2 \rangle$, $\langle a2, c1 \rangle$, and $\langle a2, c2 \rangle$. When the data is scanned, the occurrences of each valid item are stored in an occurrence buffer of the item. For instance, "3:1,3" (TID: RID list) in the buffer for item $\langle a2 \rangle$ means both record 1 and record 3 of transaction 3 are instances of $\langle a2 \rangle$.

Reasons that we preferably use the occurrence buffers are: (i) we want to differentiate records in each transaction in order to support the counting for "exclusive" itemsets; and (ii) we do not want to check all the patterns for each transaction coming in. The occurrence buffers allow the mining system to perform in a "batch" mode. Whenever the buffer is filled, the support for each pattern is counted by simultaneously scanning the occurrence buffers of all the items of which the pattern is composed. The scan is synchronized by TID. The count of the pattern is increased if each of its items is supported by different records in a same transaction. For example, as shown in FIG. 8, pattern ⟨a2⟩⟨a2, b1⟩ consists of two items ⟨a2⟩, and ⟨a2, b1⟩. When the occurrence buffers of ⟨a2⟩ and ⟨a2, b1⟩ are scanned, it is found that they are both supported in transaction 1 and 2, but only in transaction 1, they are supported by different records, thus the count of the pattern is increased by 1.

As mentioned, the pattern occurrence count methodology. (methodology 2) of FIG. 9 uses an item tree, such as the item tree described above in the context of FIG. 8. Methodology 2 of FIG. 9 comprises a loop which is executed in accordance with lines 1 through lines 12. For each tuple in the dataset, line 2 finds all the items (nodes in the item tree) that are supported by the tuple. Line 4 saves the TID (transaction ID) and RID (Record ID) of the tuple into the occurrence buffer of each item found on line 2. Line 6 checks if any occurrence buffer is full. If it is, line 7 and 8 synchronously scan all occurrence buffers (TIDs in occurrence buffers are in ascending order and are used as the reference of the synchronization) to add up the count of different records that support each pattern.

Based on the templates on the previous level, an illustrative methodology for generating all the current templates is shown in methodology 3 of FIG. 10. The methodology starts, at line 1, by setting the child templates to be an empty set. Then, a loop is executed in accordance with lines 2 to 7. For each parent template, line 3 scans all of its candidate child templates. Lines 4 and 5 choose those candidates that have non-empty parent patterns, and user preferences are not applicable. Line 8 outputs all of the child templates generated in the loop. A child template is to be generated only if all of its parents exist and have non-empty patterns. With respect to methodology 3, each template can have multiple successors, and they are generated and tested multiple times.

Alternatively, the HIFI framework may use the following methodology in place of the methodology shown in FIG. 10. Based on a parent template $\vec{p} = (\vec{T}_1, \ldots, \vec{T}_k)$, a subset of its child templates is created using the following steps: (i) adding a single attribute item $\vec{T}_{k+1}$ to $\vec{p}$ such that $\vec{T}_k \preceq \vec{T}_{k+1}$; and (ii) adding a new attribute to an existing item $\vec{T}_i$ to create a new item T' such that $\vec{T}_k \preceq T'$. For instance, given a dataset with only two attributes, A and B and a template (A)(AB), (A)(AB)(B) is created according to (i) and (AB)(AB) according to (ii). Other child templates of (A)(AB) are generated by their other parents, e.g., (A)(A)(AB) by (A)(A)(A). It may be proven that each template on the new level is generated once and only once.

A core of the HIFI framework is the candidate generation procedure shown in methodology 4 of FIG. 11. The rationale and the correctness are discussed above. The methodology has two major components: candidate generation by joining two of its parents and candidate filtering by the rest of the parents.

Methodology 4 comprises a loop which is executed in accordance with line 1 through line 16. For each template c, line 2 chooses two of its parents that have the least number of patterns. Line 3 decides the cost of merge-join if instead $c_L$ and $c_{L-1}$ are used. Line 4 and line 7 perform the join operation. As joining parents other than $c_L$ and $c_{L-1}$ will disrupt the order of the patterns, line 8 restores such order. Line 10 consults user preferences to prune the generated patterns. Then, a loop from line 11 through line 15 applies the above-mentioned Apriori property on the generated patterns by using each parent that is not involved in the join operation.

Referring now to FIG. 12, a block diagram is shown illustrating a generalized hardware architecture of a computer system suitable for implementing the various functional components/modules of a system for mining attribute associations as depicted in the figures and explained in detail herein. It is to be understood that the individual components of the data mining system, e.g., system 200 as illustrated in FIG. 2, may be implemented on one such computer system, or on more than one separate such computer system. Also, individual components of the system may be implemented on separate such computer systems. It is to be appreciated that the user may interact directly with the one or more computer systems implementing the data mining system 200. Alternatively, the user may employ a computer system in communication (e.g., via a remote or local network) with the one or more computer systems implementing the system 200 in order to interact with the system 200.

As shown, the computer system may be implemented in accordance with a processor 1210, a memory 1220 and I/O devices 1230, coupled via a suitable computer bus or network 1240. It is to be appreciated that the term "processor" as used herein is intended to include any processing device, such as, for example, one that includes a CPU (central processing unit) and/or other processing circuitry. The term memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices (e.g., keyboard, mouse, etc.) for entering data (e.g., user preferences, etc.) to the processing unit, and/or one or more output devices (e.g., CRT display, printer, etc.) for presenting results (e.g., mining results, etc.) associated with the processing unit. For example, system user interfaces employed by the user may be realized through such I/O devices. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Accordingly, as described in detail above, the present invention provides the search space for frequent itemsets in a novel architecture, where pattern templates are tightly coupled in the anti-monotonic relationships. Using such relationships, and an efficient candidate generation methodology based on merge-join, the inventive approach is able to prune away a large amount of candidate patterns, thus greatly improving the mining performance.

The invention also localizes the candidate generation and pruning procedure to each pattern template. Given a set of query templates, we are able to find their frequent itemsets by exploring a much smaller search space than explored with traditional approaches. Furthermore, the invention is relational and attribute sensitive in that we do not encode the attribute information of a relational table into items. The organization of the search space is also conducive to the interpretation and analysis of the resulting patterns. The invention supports demand-driven, interactive and online database centric mining where the data to be mined are generated on the fly by other query tools.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of mining attribute associations in a relational data set, comprising the steps of:

inputting multiple items from the relational data set;

discovering attribute associations using: (i) multi-attribute mining templates formed from at least a portion of the multiple items, wherein each multi-attribute mining template comprises at least one item described by at least two attributes; and (ii) one or more mining preferences specified by a user, wherein the one or more mining preferences specified by the user comprise specification of at least one of: (a) one or more desired multi-attribute mining templates; (b) one or more irrelevant multi-attribute mining templates; and (c) one or more rules concerning values of attributes in the multi-attribute mining templates, further wherein the attribute association discovering step further comprises generating candidate patterns at a template level, wherein candidate patterns of multi-attribute mining templates are derived by merge-joining patterns of nodes of at least a portion of the templates without pre-sorting; and outputting the discovered attribute associations to at least one of the user and another system;

wherein the multi-attribute mining templates are related by an anti-monotonicity property such that the property holds when mining top-down from k-itemsets to (k+1)-itemsets and when mining items defined by a set of k attributes to items defined by k+1 attributes.

2. The method of claim 1, wherein the candidate pattern generating step further comprises maintaining one or more occurrence buffers to count occurrences of patterns.

3. The method of claim 1, wherein the attribute association discovering step further comprises pruning candidate patterns at a template level.

4. Apparatus for mining attribute associations in a relational data set, comprising:

a memory; and at least one processor coupled to the memory and operative to: (i) input multiple items from the relational data set; (ii) discover attribute associations using: (i) multi-attribute mining templates formed from at least a portion of the multiple items, wherein each multi-attribute mining template comprises at least one item described by at least two attributes; and (ii) one or more mining preferences specified by a user, wherein the one or more mining preferences specified by the user comprise specification of at least one of: (a) one or more desired multi-attribute mining templates; (b) one or more irrelevant multi-attribute mining templates; and (c) one or more rules concerning values of attributes in the multi-attribute mining templates, further wherein the attribute association discovering operation further comprises generating candidate patterns at a template level, wherein candidate patterns of multi-attribute mining templates are derived by merge-joining patterns of nodes of at least a portion of the templates without pre-sorting; and (iii) output the discovered attribute associations to at least one of the user and another system; wherein the multi-attribute mining templates are related by an anti-monotonicity property such that the property holds when mining top-down from k-itemsets to (k+1)-itemsets and when mining items defined by a set of k attributes to items defined by k+1 attributes.

5. The apparatus of claim 4, wherein the candidate pattern generating operation further comprises maintaining one or more occurrence buffers to count occurrences of patterns.

6. The apparatus of claim 4, wherein the attribute association discovering operation further comprises pruning candidate patterns at a template level.

7. An article of manufacture for mining attribute associations in a relational data set, comprising a computer readable storage medium containing executable program code which implements the steps of:

inputting multiple items from the relational data set;

discovering attribute associations using: (i) multi-attribute mining templates formed from at least a portion of the multiple items, wherein each multi-attribute mining template comprises at least one item described by at least two attributes; and (ii) one or more mining preferences specified by a user, wherein the one or more mining preferences specified by the user comprise specification of at least one of: (a) one or more desired multi-attribute mining templates; (b) one or more irrelevant multi-attribute mining templates; and (c) one or more rules concerning values of attributes in the multi-attribute mining templates, further wherein the attribute association discovering step further comprises generating candidate patterns at a template level, wherein candidate patterns of multi-attribute mining templates are derived by merge-joining patterns of nodes of at least a portion of the templates without pre-sorting; and outputting the discovered attribute associations to at least one of the user and another system;

wherein the multi-attribute mining templates are related by an anti-monotonicity property such that the property holds when mining top-down from k-itemsets to (k+1)-itemsets and when mining items defined by a set of k attributes to items defined by k+1 attributes.

8. The article of claim 7, wherein the candidate pattern generating step further comprises maintaining one or more occurrence buffers to count occurrences of patterns.

9. The article of claim 7, wherein the attribute association discovering step further comprises pruning candidate patterns at a template level.

* * * * *

UNITED STATES PATENT AND TRADEMARK OFFICE
CERTIFICATE OF CORRECTION

PATENT NO.         : 7,243,100 B2
APPLICATION NO.    : 10/630992
DATED              : July 10, 2007
INVENTOR(S)        : S. Ma et al.

It is certified that error appears in the above-identified patent and that said Letters Patent is hereby corrected as shown below:

In the title:
Please delete "Methods and Apparatus for Mining Attribute Associations"
and insert --Method and Apparatus for Deriving Candidate Patterns of Multi-Attribute Templates Related by Anti-Monotonicity Property by Merge-Joining Patterns of Nodes of Templates Without Pre-sorting--
    On page 2, under "Other Publications"
Reference 6 please delete "Mohammead" and insert --Mohammad--

In the Specification:
Col.7 line 18 please delete "< L=$\Sigma_{i=1}^{k}|T_i|$ >" and insert --$<L = \sum_{i=1}^{k} |T_i| >$--

Col.7 line 49 please delete "<HTFI>" and insert --<HIFI>--

Col.7 line 60 please delete "< L=$\Sigma_{i=1}^{m}|T_i|$ >" and insert --$<L = \sum_{i=1}^{m} |T_i| >$--

Signed and Sealed this

Fourteenth Day of August, 2007

JON W. DUDAS
*Director of the United States Patent and Trademark Office*